United States Patent
Hamada et al.

[11] Patent Number: 6,156,441
[45] Date of Patent: *Dec. 5, 2000

[54] EASILY TEARABLE BIAXIALLY ORIENTED POLYESTER FILM

[75] Inventors: Tomohiro Hamada; Minoru Kishida; Tetsuo Matsumoto, all of Uji, Japan

[73] Assignee: Unitika Ltd., Hyogo, Japan

[*] Notice: This patent is subject to a terminal disclaimer.

[21] Appl. No.: 08/947,145

[22] Filed: Oct. 8, 1997

[30] Foreign Application Priority Data

Oct. 9, 1996 [JP] Japan ................................ 8-268987

[51] Int. Cl.$^7$ .......................... B65D 30/02; B65D 33/00; C08F 20/10

[52] U.S. Cl. ..................... 428/480; 428/35.2; 428/35.7; 428/36.92; 428/910; 525/444; 206/524.1; 383/201

[58] Field of Search ................................ 428/35.2, 35.7, 428/36.92, 910, 480; 383/200, 201; 206/524.1, 524.6; 525/444

[56] References Cited

U.S. PATENT DOCUMENTS

| | | | |
|---|---|---|---|
| 3,013,914 | 12/1961 | Willard | 154/43 |
| 4,070,417 | 1/1978 | Isaka et al. | 260/860 |
| 4,228,218 | 10/1980 | Takayanagi et al. | 525/58 |
| 4,286,011 | 8/1981 | Wong | 428/220 |
| 5,284,699 | 2/1994 | Nishino et al. | 428/217 |
| 5,613,779 | 3/1997 | Niwa | 383/201 |
| 5,912,060 | 6/1999 | Kishida et al. | 428/35.2 |

FOREIGN PATENT DOCUMENTS

| | | |
|---|---|---|
| 0 437 942 A2 | 7/1991 | European Pat. Off. . |
| 8-169962 | 7/1996 | Japan . |

OTHER PUBLICATIONS

Derwent Abstract of JP 8–169962A; Biaxially Stretched Polyester Film For Packing Material; Unitika, Jul. 1996.
West–JPO Abstract of JP 408169962A; Biaxially Oriented Polyester Film; Kishida, Hioki and Ishikawa, Jul. 1996.

*Primary Examiner*—Rena L. Dye
*Assistant Examiner*—John J. Figueroa
*Attorney, Agent, or Firm*—Wenderoth, Lind & Ponack, L.L.P.

[57] ABSTRACT

The present invention provides a biaxially oriented polyester film having a linearly tearable property at least in a longitudinal direction, and excellent in the producability at mass production scale, which can be produced from the mixture of polybutylene terephthalate containing 5 to 20% by weight of a polytetramethylene glycol (PTMG) unit having a molecular weight of 600 to 4,000 (modified PBT) and polyethylene terephthalate (PET) in a weight ratio (PET/modified PBT) of 70/30 to 95/5.

16 Claims, 1 Drawing Sheet

EASILY TEARABLE BIAXIALLY ORIENTED POLYESTER FILM

BACKGROUND OF THE INVENTION

1. Field of the Invention

The present invention relates to a biaxially oriented polyester film which has excellent linearly tearable property at least in a longitudinal direction of the film, excellent strength, excellent heat resistance and excellent dimensional stability and is useful as a packaging material for foods (e.g. confectionery, pickle, soybean paste, soup, jam, etc.), frozen foods, refrigerated foods, retort-packed foods, drugs, daily necessities and cosmetics.

2. Description of the Related Art

Various packaging bags made of plastic films are widely used for packaging foods, drugs, miscellaneous goods, etc., and packaging bags produced by laminating two or more biaxially oriented plastic films and heat-sealable non-oriented plastic film are widely used.

The biaxially oriented polyester film is superior in durability, moisture resistance, mechanical strength, heat resistance and oil resistance, and biaxially oriented polyester films produced by a tubular method, a flat simultaneous biaxially orienting method, a flat successive biaxially orienting method and the like are used in the field of food packaging.

However, the packaging bags using these biaxially oriented polyester films have a problem that the tearing property is poor. In order to improve the tearing property, a method of providing a notch is used. However, there often arises a phenomenon that the packaging bag can not be linearly torn in case of tearing from this notch. In that case, not only the contents scatter on opening resulting in waste, but also clothes are sometimes soiled by an accident such as breakage of a soft confectionery such as cookie on opening, especially when the contents are liquid.

Examples of the easily openable material, which is superior in linearly tearable property when tearing the film, include a laminated film containing a monoaxial oriented polyolefin film as an intermediate layer. For example, there is a three-layer laminated film of a biaxially oriented polyester film/monoaxial oriented polyolefin film/non-oriented polyolefin film. In this case, it is necessary to provide an intermediate layer intentionally, thereby causing a problem of high cost. Therefore, use thereof was limited.

Therefore, as a method of imparting the linearly tearable property to the biaxially oriented polyester film itself, there has been suggested a biaxially oriented polyester film using as a main raw material a mixture comprising a thermoplastic polyester resin (i) wherein an acid component is mainly composed of terephthalic acid or naphthalenedicarboxylic acid, and a thermoplastic polyester resin (ii) capable of forming a phase-separation from the polyester resin (i) (see Japanese Patent Application KOKAI No. 169962/1996).

The above gazette discloses that polyethylene terephthalate (hereinafter referred to as "PET") is used as (i) and a polyether polyester block copolymer comprising polytetramethylene glycol (hereinafter referred to as "PTMG") and polytetramethylene terephthalate is used as (ii). However, when the production is conducted on a scale of mass production, for example, using an extruder (200 mmφ) or more), the unevenness of the film increased to cause problems such as difficulty in film formation, deterioration of the linearly tearable property of the resulting film, decrease in commercial value as the packaging bag due to an increase in haze of the film, etc.

SUMMARY OF THE INVENTION

It is an object of the present invention to solve the above problems, thereby providing a biaxially oriented polyester film having a stable linearly tearable property and an excellent productivity on a scale of mass production, with maintaining low moisture absorption property, mechanical characteristics, transparency, aroma retention property, heat resistance and oil resistance as a special merit of the biaxially oriented polyester film as well as dimensional stability under dry heat and wet heat environmental conditions required particularly to the food packaging material.

The problems can be solved by forming a film using a composition prepared by formulating polybutylene terephthalate containing polytetramethylene glycol having a specific molecular weight (the polytetramethylene glycol is referred to as "PTMG" hereinafter) in a specific amount (the polybutylene terephthalate containing PTMG is referred to as "modified PBT" hereinafter).

DESCRIPTION OF THE PREFERRED EMBODIMENTS

Figure 1:
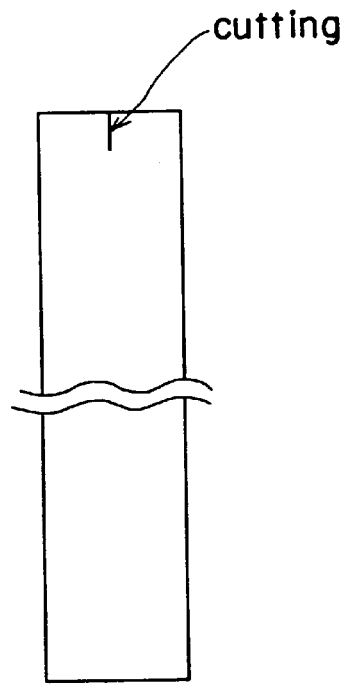
FIG. 1 is a schematic view of a test piece used for the evaluation of the linearly tearable property of a film.

The present invention relates to a biaxially oriented polyester film having a linearly tearable property at least in a longitudinal direction, which is produced from the mixture of (a) polybutylene terephthalate containing 5 to 20% by weight of a polytetramethylene glycol (PTMG) unit having a molecular weight of 600 to 4,000 (modified PBT) and (b) polyethylene terephthalate (PET) in a weight ratio (PET/modified PBT) of 70/30 to 95/5.

PET in the present invention is obtained by a well known method, that is, a method of an ester interchange reaction between dimethyl terephthalate and ethylene glycol, or a method of obtaining an oligomer by means of a direct esterification reaction between terephthalic acid and ethylene glycol and subjecting said oligomer to the melt polymerization or solid phase polymerization. So far as the effect of the present invention can be obtained, other components may be copolymerized.

Examples of the other copolymerizable component include dicarboxylic acid such as isophthalic acid, phthalic acid, 2,6-naphthalenedicarboxylic acid, 5-sodium sulfoisophthalic acid, succinic acid, adipic acid, sebacic acid, dodecanoic diacid, dimer acid, maleic anhydride, maleic acid, fumaric acid, itaconic acid, citraconic acid, mesaconic acid, cyclohexanedicarboxylic acid, etc.; oxycarboxylic acid such as 4-hydroxybenzoic acid, ε-caprolactone, lactic acid, etc.; glycol such as 1,3-propanediol, 1,6-hexanediol, cyclohexanedimethanol, etc.; and polyfunctional compound such as trimellitic acid, trimesic acid, pyromellitic acid, trimethylolpropane, glycerine, pentaerythritol, etc.

The molecular weight of PTMG used in the present invention is from 600 to 4,000, preferably from 1,000 to 3,000, more preferably from 1,000 to 2,000.

When the molecular weight is less than 600, the linearly tearable property is not obtained. On the other hand, when it exceeds 4,000, performances such as mechanical strength, dimensional stability, haze, etc. are deteriorated. Furthermore, the stable linearly tearable property of the film is not obtained.

In the present invention, the modified PBT is obtained from an esterified compound (BT) of 1,4-butanediol and terephthalic acid, and PTMG, and BT as a raw material is obtained by a method of esterifying terephthalic acid directly with 1,4-butanediol, or transesterification between terephthalic acid and its lower alkyl esters (e.g. methyl, ethyl, isopropyl, etc.) and 1,4-butanediol. Particularly preferred BT is obtained by the transesterification between 1,4-butanediol and dimethyl terephthalate. A ratio of terephthalic acid (ester)/1,4-butanediol is preferably 1 mol/1.05–1.80 mols, more preferably 1 mol/1.10–1.60 mols. Regarding the reaction between terephthalic acid or its lower alkyl ester and 1,4-butanediol, both are substantially completely reacted to each other to form an ester, and an oligomer may be formed. The average polymerization degree of the ester is from about 1 to 10. The resulting BT has an unreacted carboxyl group or its lower alkyl ester and a hydroxyl group. This is further polycondensated with PTMG having a molecular weight of 600 to 4,000, or PTMG and PBT are melt-kneaded to form the modified PBT.

1,4-Butanediol as the raw material may be replaced partially by the other glycols (up to 20% by mol), for example, alkylene glycol having 2 to 8 carbon atoms, such as ethylene glycol, propylene glycol, trimethylene glycol, etc. unless the characteristics are deteriorated.

Similarly, regarding polytetramethylene glycol, the tetramethylene group may also be replaced partially by other alkylene group (up to 20% by mol) unless the characteristics are deteriorated.

In the film of the present invention, the content of the PTMG unit constituting the modified PBT is from 5 to 20% by weight, preferably from 10 to 20% by weight, more preferably from 10 to 15% by weight.

When the content of PTMG is less than 5% by weight, the linearly tearable property of the resulting film is not obtained. On the other hand, when it exceeds 20% by weight, performances such as mechanical strength, dimensional stability, haze, etc. of the resulting film are deteriorated and it becomes difficult to obtain the stable linearly tearable property of the film. On the other hand, when the content of PTMG exceeds 20% by weight, there sometimes arises a phenomenon wherein the film pulsates on extrusion when the production is conducted on a scale of mass production where an extruder of 200 mmφ or more is used (so-called Barus phenomenon) to cause a problem that the unevenness of the film increases.

In order to produce the film of the present invention, it is necessary to adjust the mixing ratio (weight ratio) of PET/modified PBT within the range from 70/30 to 95/57 preferably from 80/20 to 90/10, more preferably from 85/15 to 90/10.

When the mixing ratio of the modified PBT is less than 5% by weight, the linearly tearable property is not obtained. On the other hand, when it exceeds 30% by weight, not only a change in thickness of the film increases and the linearly tearable property of the resulting film is lowered, but also performances such as mechanical strength, dimensional stability, haze, etc. are lowered, which results in problem on practical performances. That is, in order to impart the linearly tearable property and practical performances of the film, it is necessary to adjust the mixing ratio of PET to modified PBT within the above range.

The modified PBT in the present invention can also be obtained by adding PTMG to BT, followed by polycondensation. It is also obtained by a more simple method of melt-kneading a polybutylene terephthalate (PBT) obtained by further polycondensing BT, with PTMG using an extruder.

Incidentally, unless the effect of the present invention is spoiled, other polymers such as polyethylene naphthalate, polycyclohexylenedimethylene terephthalate, etc. can be mixed with the raw material resin in the present invention.

In case of producing the film of the present invention, a mixture of the modified PBT and PET is introduced in an extruder first and, after melting with heating, the molten mixture is extruded in the form of a sheet through a die orifice of a T-die to produce an unoriented sheet.

The sheet extruded through the die orifice of the T-die is cooled in closely contacting with a cooling drum by means of the electrostatic casting method, oriented at a ratio of 3.0 to 5.0 in longitudinal and lateral directions and then heat-treated at the temperature of 210 to 245° C. to form a biaxially oriented film.

When the orienting temperature is lower than 90° C., a homogeneous oriented film can not be obtained, sometimes. On the other hand, when it exceeds 140° C., the crystallization of PET is accelerated and the transparency sometimes becomes inferior.

When the orienting ratio is less than 3.0, the strength of the resulting oriented film is low and pinhole is liable to arise when formed into a bag. On the other hand, when it exceeds 5.0, it becomes difficult to conduct orientation.

Furthermore, when the heat-treating temperature is lower than 210° C., the heat shrinkage rate of the resulting oriented film becomes large and the bag after formed is sometimes deformed. On the other hand, when the heat-treating temperature is higher than 245° C., fusing of the film sometimes arises.

The biaxially orienting method may be any one of a tenter simultaneous biaxially orienting method and a successive biaxially orienting method using a roll and a tenter. Furthermore, the biaxially oriented film may also be produced by a tubular method.

It is preferred that the biaxially oriented polyester film of the present invention has a tensile strength within the range from 17 to 35 kgf/mm$^2$. When the tensile strength is smaller than this range, the practical strength is insufficient. On the other hand, even when it exceeds this range, not only the quality becomes more than enough but also the operation property on production of the film is lowered and, therefore, it is not preferred economically.

Furthermore, it is preferred that the tensile elongation is normally within the range from 80 to 160% (average value in longitudinal and width directions).

It is preferred that the heat shrinkage factor of the biaxially oriented polyester film of the present invention is within the range of not more than 3% (average value in longitudinal and width directions) after subjecting to a heat treatment of 160° C.×15 minutes. When it exceeds 3%, the printability is deteriorated and, therefore, it is not preferred.

It is preferred that the biaxially oriented polyester film of the present invention has a haze of not more than 10%. When the haze exceeds 10%, the transparency of the film becomes inferior and the commercial value is lowered.

It is possible to subject the biaxially oriented film of the present invention to surface treatment such as corona discharge treatment, surface hardening treatment, plating treatment, coloring treatment, paint finishing treatment, coating treatment and the like.

The following Examples illustrate the present invention in detail.

Raw materials and measuring methods used in the evaluation of the Examples and Comparative Examples are as follows.

(1) Raw material

PET: manufactured by Unitika Ltd., having a relative viscosity of 1.38

PBT: available from Mitsubishi Engineering Plastics Co., Ltd.

in the name of Novadule 5010 having a relative viscosity of 1.10 (measurement is the same as that described above)

(2) Measurement

Relative viscosity:

The relative viscosity of the solution of the resin in a mixture of phenol and tetrachloroethane (1:1 by weight) was measured at a concentration of 0.5 g/dl and at 20° C.

Linearly tearable property:

Ten test pieces were produced by cutting a biaxially oriented film into film pieces of a strip shape [205 mm in a longitudinal direction (MD direction) and 40 mm in a width direction (TD direction) and forming a notch of 5 mm (length) at a center portion of one short side of these film pieces (see FIG. 1).

Figure 2A:
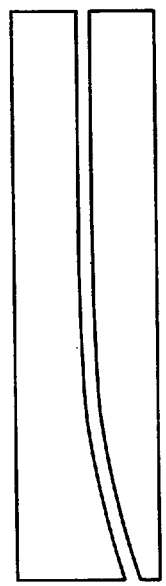
FIG. 2 is a schematic view of a test piece after tearing in a tearing test, wherein (a) illustrates an example of a test piece after tearing of a sample having good linearly tearable property while (b) illustrates an example of a sample having poor linearly tearable property.
Figure 2B:
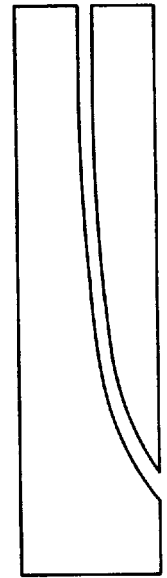

Then, the test piece was torn from the notch in the MD direction by hands and the number of test pieces wherein a tearing propagation end reached a short side which faces the side with the notch, as shown in FIG. 2(a), was taken as the evaluation value of the linearly tearable property in the MD direction (evaluation value of not less than 8 was judged as "acceptance").

The linearly tearable property in the TD direction was determined according to the same manner as that described above except for using those obtained by cutting the film into film pieces of a strip shape [205 mm in the TD direction and 40 mm in the MD direction] as the test piece.

Incidentally, the evaluation was conducted with respect to the left end portion, center portion and right end portion of the film which was wound up after oriented.

Haze:

The haze of the film having a thickness of 12 $\mu$m was measured according to ASTM D103-61.

Tensile strength:

The tensile strength of the test piece having a width of 10 mm and a length of 100 mm was measured according to ASTM-D882.

Unevenness:

Using a micrometer manufactured by Hydenhyne Co, the thickness of the center portion in the width direction of the film was measured at 20 points at a pitch of 10 cm in the MD direction, and then the unevenness (%) was determined according to following formula:

[(Maximum thickness value−minimum thickness value)/average thickness value]×100

EXAMPLE 1

194 Parts by weight of dimethyl terephthalate, 108 parts by weight of 1,4-butanediol and tetrabutyl titanate (80 ppm in terms of a weight of titanium metal based on the polymer) were added and transesterified at 150 to 210° C. for 2.5 hours.

The obtained reaction product (90 parts by weight) was charged into a polymerization vessel, tetrabutyl titanate (40 ppm) and 10 parts by weight of PTMG having a molecular weight of 1,100 were added, and then evacuated to finally 1 hPa. Under this pressure the melt polymerization was conducted with heating from 210 to 245° C. for 2 hours to obtain a modified PBT having a relative viscosity of 1.60.

A composition prepared by simple chip-mixing PET with the modified PBT in a weight ratio of 85/15 was melt-extruded at a resin temperature of 280° C. using a 200 mm$\phi$ extruder equipped with a coat hanger type T-die, and then rapidly cooled in closely contact with a cast roll, whose temperature was adjusted to 20° C., with applying an applied voltage of 7 kV to an pinning wire to obtain an unoriented sheet having a thickness of about 190 $\mu$m.

The resulting unoriented sheet was oriented at 90° C. by a roll longitudinally orienting device (orienting ratio: 3.5) and oriented at 120° C. by a tenter lateral orienting device (orienting ratio: 4.5), heat-treated at 235° C. (relaxation rate in lateral direction: 3%) and then cooled to a room temperature gradually to obtain a biaxially oriented film having a thickness of 12 $\mu$m.

The linearly tearable property of the resulting biaxially oriented film was measured. The results are shown in Table 1.

EXAMPLES 2 TO 12

Comparative Examples 1 to 8

According to the same manner as that described in Example 1 except for changing the molecular weight of PTMG, weight ratio of PTMG in the modified PBT and weight ratio of PET to the modified PBT as shown in Table 1 and Table 2, a biaxially oriented film was obtained, respectively.

The linearly tearable property of the resulted biaxially oriented film was measured. The results are shown in Table 1 and Table 2.

In Examples 2 to 12, the biaxially oriented film having excellent transparency, strength, thickness accuracy and linearly tearable property was obtained. In Comparative Examples 1 to 2, since the copolymerization proportion of PTMG in the modified PBT is large, the unevenness of the resulting film increased. Particularly, in Comparative Example 1, it became impossible to form a film.

In Comparative Examples 3 to 4, since the copolymerization proportion of PTMG in the modified PBT is too small, the linearly tearable property was not obtained.

In Comparative Example 5, since the molecular weight of PTMG in the modified PBT is too small, the linearly tearable property was not obtained. In Comparative Example 6, since the molecular weight of PTMG is too large, the unevenness increased and the linearly tearable property was deteriorated.

In Comparative Example 7, since the amount the modified PBT formulated is too small, the linearly tearable property was not obtained. In Comparative Example 8, since the amount of the modified PBT formulated is too large, the unevenness increased and the linearly tearable property was deteriorated.

EXAMPLE 13

A composition prepared by chip-mixing PBT with PTMG having a molecular weight of 2,000 in a weight ratio of 85/15 (PBT/PTMG) was melt-extruded using a twin-screw extruder and then chipped to prepare modified PBT (relative viscosity: 1.36).

Then, a composition prepared by chip-mixing the resulting modified PBT with PET in a weight ratio of 15/85 (modified PBT/PET) using a 200 mmφ extruder equipped with a coat hanger type T-die was melted and extruded in retention time of 5 minutes and at resin temperature of 270° C., and then rapidly cooled in closely contact with a cast roll whose temperature was adjusted to 20° C., with applying an applied voltage of 7 kV to an pinning wire to obtain an unoriented sheet having a thickness of about 190 μm.

The resulting unoriented sheet was oriented at 90° C. by a roll longitudinal orienting device (orienting ratio: 3.5) and oriented at 120° C. by using a tenter lateral orienting device orienting ratio: 4.5), heat-treated at 235° C. (relaxation rate in lateral direction: 3%) and then air-cooled to room temperature to obtain a biaxially oriented film having a thickness of 12 μm.

The linearly tearable property of the resulting biaxially oriented film was measured. The results are shown in Table 1.

TABLE 1

| | weight ratio | | | | | linearly tearable property | | | tensile strength | | |
|---|---|---|---|---|---|---|---|---|---|---|---|
| | modified PBT | | modified | | PTMG | position to be | direction | | MD/TD | haze | unevenness |
| | PTMG | PBT | PBT | PET | M.W. | evaluated | MD | TD | (kgf/mm²) | (%) | (%) |
| Ex. 1 | 10 | 90 | 15 | 85 | 1100 | left end portion | 10 | 9 | 22/26 | 5.0 | 5.0 |
| | | | | | | center | 10 | 10 | | | |
| | | | | | | right end portion | 10 | 9 | | | |
| Ex. 2 | 15 | 85 | 25 | 75 | 1100 | left end portion | 10 | 10 | 22/25 | 7.0 | 6.0 |
| | | | | | | center | 10 | 10 | | | |
| | | | | | | right end portion | 10 | 10 | | | |
| Ex. 3 | 15 | 85 | 10 | 90 | 1100 | left end portion | 10 | 8 | 24/27 | 5.0 | 5.0 |
| | | | | | | center | 10 | 9 | | | |
| | | | | | | right end portion | 10 | 8 | | | |
| Ex. 4 | 5 | 95 | 15 | 85 | 1100 | left end portion | 9 | 9 | 24/27 | 4.0 | 5.0 |
| | | | | | | center | 10 | 9 | | | |
| | | | | | | right end portion | 9 | 9 | | | |
| Ex. 5 | 5 | 95 | 25 | 75 | 1100 | left end portion | 10 | 9 | 24/27 | 5.0 | 6.0 |
| | | | | | | center | 10 | 10 | | | |
| | | | | | | right end portion | 10 | 9 | | | |
| Ex. 6 | 5 | 95 | 10 | 90 | 1100 | left end portion | 9 | 8 | 24/27 | 4.0 | 5.0 |
| | | | | | | center | 10 | 9 | | | |
| | | | | | | right end portion | 9 | 8 | | | |
| Ex. 7 | 20 | 80 | 15 | 85 | 3600 | left end portion | 10 | 9 | 22/25 | 6.0 | 7.0 |
| | | | | | | center | 10 | 10 | | | |
| | | | | | | right end portion | 10 | 9 | | | |
| Ex. 8 | 20 | 80 | 25 | 75 | 3600 | left end portion | 10 | 10 | 20/23 | 8.0 | 8.0 |
| | | | | | | center | 10 | 10 | | | |
| | | | | | | right end portion | 10 | 10 | | | |
| Ex. 9 | 20 | 80 | 10 | 90 | 3600 | left end portion | 10 | 8 | 23/26 | 6.0 | 6.0 |
| | | | | | | center | 10 | 9 | | | |
| | | | | | | right end portion | 10 | 8 | | | |
| Ex. 10 | 5 | 95 | 15 | 85 | 3600 | left end portion | 9 | 8 | 24/27 | 5.0 | 6.0 |
| | | | | | | center | 10 | 9 | | | |
| | | | | | | right end portion | 9 | 8 | | | |
| Ex. 11 | 5 | 95 | 25 | 75 | 3600 | left end portion | 10 | 8 | 23/26 | 6.0 | 7.0 |
| | | | | | | center | 10 | 10 | | | |
| | | | | | | right end portion | 10 | 9 | | | |
| Ex. 12 | 5 | 95 | 10 | 90 | 3600 | left end portion | 9 | 8 | 24/27 | 5.0 | 6.0 |
| | | | | | | center | 10 | 9 | | | |
| | | | | | | right end portion | 9 | 8 | | | |
| Ex. 13 | 15 | 85 | 15 | 85 | 2000 | left end portion | 8 | 9 | 22/23 | 6.0 | 5.0 |
| | | | | | | center | 10 | 10 | | | |
| | | | | | | right end portion | 9 | 9 | | | |

TABLE 2

| | weight ratio | | | | | linearly tearable property | | | tensile strength | | |
|---|---|---|---|---|---|---|---|---|---|---|---|
| | modified PBT | | modified | | PTMG | position to be | direction | | MD/TD | haze | unevenness |
| | PTMG | PBT | PBT | PET | M.W. | evaluated | MD | TD | (kgf/mm²) | (%) | (%) |
| Comp. Ex. 1 | 25 | 75 | 15 | 85 | 1100 | left end portion center right end portion | failed in film formation | | | | |
| Comp. Ex. 2 | 25 | 75 | 5 | 95 | 1100 | left end portion | 6 | 5 | 24/27 | 6.0 | 15.0 |
| | | | | | | center | 8 | 5 | | | |
| | | | | | | right end portion | 6 | 5 | | | |

TABLE 2-continued

| | weight ratio | | | | linearly tearable property | | | tensile strength | | |
|---|---|---|---|---|---|---|---|---|---|---|
| | modified PBT | | modified | | PTMG position to be | direction | | MD/TD | haze | unevenness |
| | PTMG | PBT | PBT | PET | M.W. evaluated | MD | TD | (kgf/mm$^2$) | (%) | (%) |
| Comp. Ex. 3 | 3 | 97 | 25 | 75 | 1100 left end portion | 5 | 3 | 24/27 | 5.0 | 6.0 |
| | | | | | center | 6 | 4 | | | |
| | | | | | right end portion | 5 | 3 | | | |
| Comp. Ex. 4 | 3 | 97 | 25 | 75 | 3600 left end portion | 4 | 3 | 24/27 | 5.0 | 7.0 |
| | | | | | center | 5 | 3 | | | |
| | | | | | right end portion | 4 | 3 | | | |
| Comp. Ex. 5 | 15 | 85 | 20 | 80 | 500 left end portion | 3 | 2 | 23/26 | 6.0 | 5.0 |
| | | | | | center | 4 | 3 | | | |
| | | | | | right end portion | 3 | 2 | | | |
| Comp. Ex. 6 | 15 | 85 | 20 | 80 | 4500 left end portion | 6 | 6 | 19/22 | 11.0 | 15.0 |
| | | | | | center | 8 | 7 | | | |
| | | | | | right end portion | 7 | 6 | | | |
| Comp. Ex. 7 | 15 | 85 | 3 | 97 | 1100 left end portion | 3 | 2 | 25/28 | 4.0 | 5.0 |
| | | | | | center | 5 | 3 | | | |
| | | | | | right end portion | 3 | 2 | | | |
| Comp. Ex. 8 | 15 | 85 | 35 | 65 | 1100 left end portion | 7 | 6 | 18/21 | 11.0 | 19.0 |
| | | | | | center | 8 | 7 | | | |
| | | | | | right end portion | 7 | 6 | | | |

EXAMPLES 14 TO 24

Comparative Examples 9 to 16

A four-sides sealed bag (each 200 mm in longitudinal and lateral directions) was produced by dry-laminating the films obtained in Examples 1 and 7 as well as Comparative Examples 5 and 7 according to the construction shown in Table 3, and forming the laminated film into a bag so that the longitudinal direction of the polyester film becomes a tearing direction of the bag, respectively. Then, the evaluation of the linearly tearable property was carried out.

The evaluation results of the linearly tearable property are shown in Table 3.

The evaluation was conducted as follows. That is, the bag which was torn almost linearly was judged as "acceptance" while the bag which could not been torn or torn in the inclined direction was judged as "rejection".

Abbreviations of resinous films for packaging material are as follows.

PT1: biaxially oriented film obtained in Example 1

PT2: biaxially oriented film obtained in Example 7

PT3: biaxially oriented film obtained in Comparative Example 5

PT4: biaxially oriented film obtained in Comparative Example 7

LLDPE: linear low-density polyethylene (TUX-TC manufactured by Tokyo Cellophane Co., Ltd., thickness: 60 μm)

ON: biaxially oriented nylon 6 film (manufactured by UNITIKA Ltd., thickness: 15 μm)

CPP1: non-oriented polypropylene film (manufactured by Toray Co., Ltd., thickness: 30 μm)

CPP2: non-oriented polypropylene film (manufactured by Toray Co., Ltd., thickness: 60 μm)

AL: aluminum foil (manufactured by Showa Aluminum Co., Ltd., thickness: 7 μm)

TABLE 3

| | film constitution for package | linearly tearable property |
|---|---|---|
| Example 14 | PT1/LLDPE | good |
| Example 15 | PT1/ON/LLDPE | good |
| Example 16 | PT1/CPP1 | good |
| Example 17 | PT1/ON/AL/CPP2 | good |
| Example 18 | PT2/LLDPE | good |
| Example 19 | PT2/ON/LLDPE | good |
| Example 20 | PT2/CPP1 | good |
| Example 21 | PT2/ON/AL/CPP2 | good |
| Example 22 | PET/AL/PT1/LLDPE | good |
| Example 23 | PET/PT1 (VM*) /LLDPE | good |
| Example 24 | PET/PT2 (VS*) /LLDPE | good |
| Comparative Example 9 | PT3/LLDPE | bad |
| Comparative Example 10 | PT3/ON/LLDPE | bad |
| Comparative Example 11 | PT3/CPP1 | bad |
| Comparative Example 12 | PT3/ON/AL/CPP2 | bad |
| Comparative Example 13 | PT4/LLDPE | bad |
| Comparative Example 14 | PT4/ON/LLDPE | bad |
| Comparative Example 15 | PT4/CPP1 | bad |
| Comparative Example 16 | PT4/ON/AL/CPP2 | bad |

*VM: vaporized AL on PT1
*VS: vaporized SiOx on PT2

What is claimed is:

1. A biaxially oriented polyester film having a linearly tearable property at least in a longitudinal direction, which is formed from a composition comprising (1) a modified polybutylene terephthalate (modified PBT) containing 5 to 20% by weight of a polytetramethylene glycol (PTMG) unit and (2) a polyethylene terephthalate (PET), in a weight ratio (PET/modified PBT) of 70/30 to 95/5, said PTMG having a molecular weight of 600 to 4,000.

2. The biaxially oriented polyester film according to claim 1, wherein the modified PBT is a polycondensation product of an esterified compound (BT) of terephthalic acid or esters thereof and 1,4-butanediol.

3. The biaxially oriented polyester film according to claim 1, wherein the modified PBT is a product obtained by mixing 80 to 95% by weight of polybutylene terephthalate (PBT) with 5 to 20% by weight of PTMG and melt-kneading the mixture.

4. The biaxially oriented polyester film according to claim 1, wherein the modified PBT contains 10 to 20% by weight of the PTMG unit and 80 to 90% by weight of the BT unit.

5. The biaxially oriented polyester film according to claim 1, wherein the modified PBT contains 10 to 15% by weight of the PTMG unit and 85 to 90% by weight of the BT unit.

6. The biaxially oriented polyester film according to claim 1, which has a tensile strength of from 17 to 35 kgf/mm$^2$, a dry heat shrinkage factor of not more than 3% (160° C.×15 minutes) and a haze of not more than 10%.

7. A laminated film comprising a biaxially oriented polyester film of at least one layer, said biaxially oriented polyester film having a linearly tearable property at least in a longitudinal direction and formed from a composition comprising (1) a modified polybutylene terephthalate (modified PBT) containing 5 to 20% by weight of a polytetramethylene glycol (PTMG) unit and (2) a polyethylene terephthalate (PET), in a weight ratio (PET/modified PBT) of 70/30 to 95/5, said PTMG having a molecular weight of 600 to 4,000.

8. The biaxially oriented polyester film according to claim 1, wherein the modified PET contains 10 to 30% by weight of the PTMG unit and 70 to 90% by weight of the BT unit.

9. The laminated film according to claim 7, wherein the modified PBT is a polycondensation product of an esterified compound (BT) of terephthalic acid or esters thereof and 1,4-butanediol.

10. The laminated film according to claim 7, wherein the modified PBT is a product obtained by mixing 80 to 95% by weight of polybutylene terephthalate (PBT) with 5 to 20% by weight of PTMG and melt-kneading the mixture.

11. The laminated film according to claim 7, wherein the modified PBT contains 10 to 20% by weight of the PTMG unit and 80 to 90% by weight of the BT unit.

12. The laminated film according to claim 7, wherein the modified PBT contains 10 to 15% by weight of the PTMG unit and 85 to 90% by weight of the BT unit.

13. The laminated film according to claim 7, wherein the biaxially oriented polyester film has a tensile strength of from 17 to 35 kgf/mm$^2$, a dry heat shrinkage factor of not more than 3% (160° C.×15 minutes) and a haze of not more than 10%.

14. The laminated film according to claim 7, wherein the modified PBT contains 10 to 30% by weight of the PTMG unit and 70 to 90% by weight of the BT unit.

15. The biaxially oriented polyester film of claim 1, wherein the weight ratio of PET/modified PBT is 75/25 to 95/5.

16. The laminated film of claim 7, wherein the weight ratio of PET/modified PBT is 75/25 to 95/5.

* * * * *